No. 785,351. PATENTED MAR. 21, 1905.
W. W. DOOLITTLE.
TOOL HOLDER.
APPLICATION FILED OCT. 15, 1903.
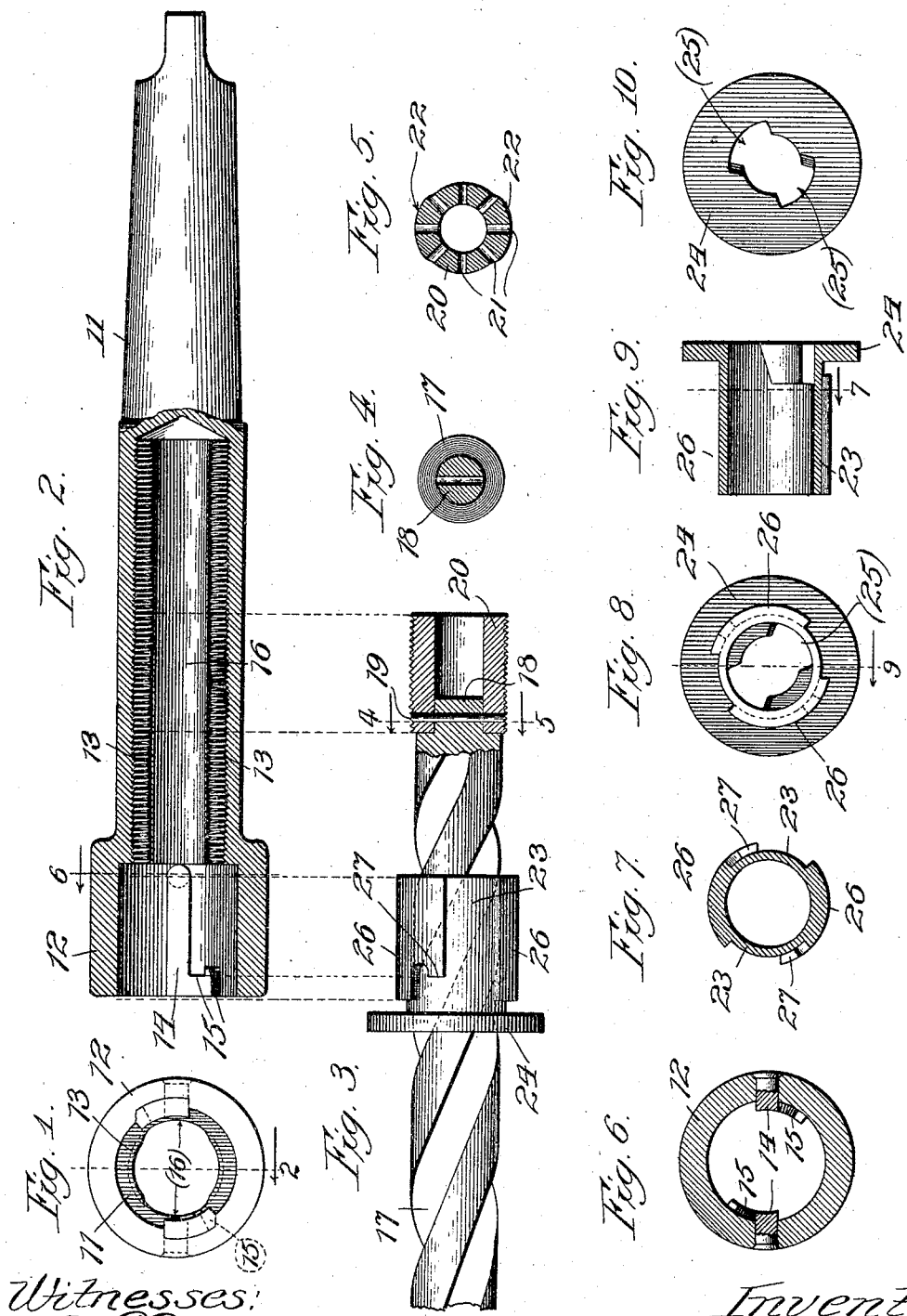
Witnesses:
Inventor:
William W. Doolittle
By Paul Synnestvedt
Atty No. 785,351. Patented March 21, 1905.

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

TOOL-HOLDER.

SPECIFICATION forming part of Letters Patent No. 785,351, dated March 21, 1905.

Application filed October 15, 1903. Serial No. 177,099.

*To all whom it may concern:*

Be it known that I, WILLIAM W. DOOLITTLE, a citizen of the United States, residing at Chicago, in the State of Illinois, have invented certain new and useful Improvements in Tool-Holders, of which the following is a specification.

My invention relates to means for holding tools, such as drill chucks and the like, and particularly to means for readily adjusting the length of the tool in revolving chucks in drilling machines. The objects of my invention are to provide a ready and accurate means for regulating or shifting the position of the drill or other similar tool; to provide an adjustable tool holder in which the tool is readily removable without the use of screws or nuts for the purpose of clamping in place; to provide a differential adjustment for the position of the tool so that it may be varied in position as desired, while avoiding mere frictional means of holding in place; to provide independent adjustable means for holding the tool against rotation and for inducing the pressure on the same, and to generally improve the structure and operation of tool holders, and provide for economy in the use of the whole tool. These objects, together with other advantages which will hereinafter appear I attain by means of the construction illustrated in preferred form in the accompanying drawing, wherein—

Figure 1 represents an end view of the tool holder;

Figure 2 is a partial central longitudinal section of the tool holder;

Figure 3 is a view of a drill and a partial section of the shank of the same, showing my screw attaching device thereon;

Figures 4 and 5 are cross sections respectively of the shank of the tool and of the screw attaching device placed thereon, the same being taken on the line (4)-(5) in Figure 3;

Figure 6 is a cross section of the end of the tool holder taken on line (6) in Figure 2;

Figure 7 is a cross section of the retaining sleeve on the drill, taken on the line (7) in Figure 9;

Figure 8 is an underplan view of the retaining sleeve shown in Figure 9;

Figure 9 is a central longitudinal section of the retaining sleeve taken on line (9) in Figure 8;

Figure 10 is a top plan view of the retaining sleeve of Figure 9;

Though I have shown in the drawings for illustration a drill to be held in a rotary chuck, it will be understood that the main features of my invention are applicable to any other tools and may co-operate with any particular means for preventing rotation of the tool in the tool holder. In order to provide for a quick and accurate adjustment of the length of the drill, or its projection from the chuck, I provide a tubular holder 11 which has a head 12 and inside its hollow shank is provided with screw threads 13 which extend approximately through a quarter of the circumference and are discontinued and the metal cut out between the two opposite rows of threads as indicated by the space (16) in Figure 1. The head 12 of the holder is provided internally with two inwardly projecting guide lugs 14 which at the bottom have an upturned end forming a notch 15 therein for a purpose hereinafter described.

On the top of the shank of the drill 17 I provide a reduced shank 18 which is bored with holes to receive the pin 19, and upon this shank I place the partially threaded head 20, which is provided with a series of holes in order to be angularly adjusted to different positions with respect to the cutting point or flutes of the drill, and it has, opposite to each other on two sides and extending through about a quarter of a turn, a series of partial threads 22 to co-operate with the threads 13 in the tool holder. It will be understood from this that when the drill is pushed into the holder in such position that the threads 22 register with the open space (16) in the tool holder, the drill may be raised or lowered any desired amount, and then by giving the drill a slight turn the respective threads 22 and 13 will engage each other to hold the drill firmly in place against a thrust at any desired point along the interior of the holder 11.

To co-operate with this means for quickly and accurately adjusting the length of the drill or its projection from the holder, I may use any desired or approved means for retaining the drill against rotation as the holder 11 rotates, or in case the work rotates, to hold the drill stationary in the holder. But ordinarily I prefer to use the retaining sleeve as illustrated in Figures 7 to 10. The sleeve 23 may be provided with a projecting flange 24, and its interior either through the whole length or only at one end as illustrated in Figure 9, is provided with an opening 25 which accurately fits over the flutes of the drill 17, as shown in Figure 10. The sleeve then being placed over the drill can be easily slid along it to any desired position depending upon the length to which the drill is desired to extend from the tool holder. On its outside, the sleeve 23 is provided with a rib 26 which ends in an upturned hooked end 27 to co-operate with the notch 15 on the inwardly projecting rib of the holder, shown in Figure 2. I prefer to use two of these ribs 26 and two of the notches 15, in order to give a more secure joint.

The parts being constructed as shown, it will be evident that the sleeve 23 being slid along the drill flutes to the proper position, the drill shank carrying the attached threaded head 20 will be slid into the shank of the holder 11 to the desired position, while the rib 26 on the sleeve 23 will slide in the open space between the ribs 14. (See Figure 6.) When properly adjusted to position, by giving the drill a partial turn the threads will lock the drill in place against longitudinal motion while the two hooks 27 and 15 will engage and lock together to firmly retain the drill against rotation. When it is desired to loosen the drill from the socket it is only necessary to raise sleeve 23 to disengage the hooks and give the drill a slight backward turn to disengage the threads 22 and 13, when the drill is readily drawn out of the holder; or being partly withdrawn, the sleeve 23 may be adjusted to a new position and the drill readily re-inserted to the desired length. It will be seen that by this arrangement the whole of the length of the drill may be used up, thus making a great saving in the steel, which is ordinarily largely wasted on account of the necessity of a long shank to the drill. The many other advantages of this device will be readily apparent to those familiar with the art.

Having thus described my invention and illustrated its use, what I claim is new and desire to secure by Letters Patent, is the following:

1. The combination with a tool having a partially threaded head thereon, of a tool holder comprising a tube provided on opposite sides of its interior circumference with partial threads to engage the threads of the tool head, and separate devices in the holder and on the tool to prevent the rotation of the tool in the holder, substantially as described.

2. In an adjustable tool holder the combination of a tube having two rows of partial threads extending along the inner surface thereof, and a partially threaded head on the tool, the threads on said head and in the tube being so placed that the head in one position may slide in the tube and in another position engages therein at any desired point, and devices upon the tool and within the tube to prevent the rotation of the tool in the holder.

3. In a tool holder the combination of a tube provided with oppositely disposed rows of partial threads therein, a tool having a partially threaded head to engage the threads of the holder at different positions, and means in the holder for retaining the tool and head against rotation therein.

4. In a holder for a fluted drill, the combination with means for holding the drill against longitudinal movement in said holder, a sleeve fitted upon the drill flutes so as to rotate therewith and being adjustable longitudinally in position thereon, and provided with a projecting rib, and an inwardly projecting rib in the drill holder, whereby the drill is prevented from rotating in the said holder.

5. In a tool holder a sleeve adapted to fit the irregular outline of the tool and slide thereon for adjusting its position thereon but not to turn thereon, combined with a holder tube having devices for holding said sleeve therein against rotation and means to prevent longitudinal movement of the tool with respect to the holder.

6. The combination of a tool holder tube having an inwardly projecting lug therein, a retaining sleeve mounted upon the tool and adapted to slide thereon but engaging so as not to rotate with respect to the tool, and said sleeve having upon its outer surface a lug adapted to co-operate with the lug in the holder tube to prevent the sleeve from rotating, and engaging threads between the tool and the holder tube to prevent longitudinal movement of the tool in the holder, substantially as described.

7. The combination with a cylindrical tool holder provided on its interior surface with rows of partial threads, a tool provided with a head having partial threads thereon to co-operate with the threads in the tool holder to prevent longitudinal movement of the tool therein, a sleeve upon the tool mounted to slide along the same and to rotate therewith, and means within the tool holder to prevent the rotation of the retaining sleeve within the said holder when adjusted to position, substantially as described.

8. In a tool holder, the combination of a tube having devices therein for holding the tool against longitudinal movement and for engaging the tool at different positions longitudinally of the tube, a movable sleeve mounted on the tool so as to move longitudinally thereof but prevented from rotation with respect thereto, and co-operating devices on said sleeve and in the holder tube for preventing turning of the tool and its sleeve within the holder, substantially as described.

9. The combination of an interiorly threaded tube and a tool having an exteriorly threaded plug adjustable thereon, the respective threads being so arranged as to engage in one axial position and disengage in another axial position, and means engaging the tube and tool to prevent the tool from turning in the tube, substantially as described.

In testimony whereof I have hereunder signed my name in the presence of the two subscribed witnesses.

WILLIAM W. DOOLITTLE.

Witnesses:
PAUL CARPENTER,
EDWARD C. BURNS.